(12) United States Patent
Dahlen et al.

(10) Patent No.: US 7,454,648 B2
(45) Date of Patent: Nov. 18, 2008

(54) SYSTEM AND METHOD FOR CALIBRATING A TIME OF DAY CLOCK IN A COMPUTING SYSTEM NODE PROVIDED IN A MULTI-NODE NETWORK

(75) Inventors: Dennis J. Dahlen, Rhinebeck, NY (US); David A. Elko, Austin, TX (US); Ronald M. Smith, Sr., Wappingers Falls, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 11/223,642

(22) Filed: Sep. 9, 2005

(65) Prior Publication Data

US 2007/0058491 A1    Mar. 15, 2007

(51) Int. Cl.
*G06F 1/00* (2006.01)
*G06F 1/14* (2006.01)
*G06F 11/00* (2006.01)

(52) U.S. Cl. .................. 713/500; 713/502; 713/503

(58) Field of Classification Search .......... 713/500, 713/502, 503
See application file for complete search history.

(56) References Cited

U.S. PATENT DOCUMENTS

| 4,448,543 A * | 5/1984 | Vail .................. 368/202 |
| 4,903,251 A | 2/1990 | Chapman |
| 5,654,718 A | 8/1997 | Beason et al. |
| 5,956,289 A | 9/1999 | Norman et al. |
| 6,049,240 A | 4/2000 | Kato |
| 6,591,370 B1 * | 7/2003 | Lovett et al. .............. 713/502 |
| 7,266,528 B2 * | 9/2007 | Nuttall .................. 705/52 |
| 7,304,981 B2 * | 12/2007 | Yoon et al. ............... 370/350 |
| 2002/0000919 A1 * | 1/2002 | Egle ..................... 340/825.2 |
| 2002/0018402 A1 * | 2/2002 | Egle et al. ............... 368/46 |
| 2005/0002279 A1 * | 1/2005 | Kondo ................... 368/104 |

OTHER PUBLICATIONS

Abstract of Japanese Patent Application No. 09-235454, dated Mar. 9, 1999.
Becker, "RightTime tm A Real Time Clock Correcting Program for MS-DOS-Based Computer Systems", www.ubr.com/clocks/timesw/rt2.html, pp. 1-6.

* cited by examiner

*Primary Examiner*—Suresh K Suryawanshi
(74) *Attorney, Agent, or Firm*—Scully, Scott, Murphy & Presser, P.C.; John E. Campbell

(57) ABSTRACT

A system, method and computer program product for calibrating a Time Of Day (TOD)-clock in a computing system node provided in a multi-node network. The network comprises an infrastructure of computing devices each having a physical clock providing a time base for executing operations that is stepped to a common oscillator. The system implements steps for obtaining samples of timing values of a computing device in the network, the values including a physical clock value maintained at that device and a TOD-offset value; computing an oscillator skew value from the samples; setting a fine steering rate value as equal to the opposite of the computed oscillator skew value; and, utilizing the fine steering rate value to adjust the physical clock value and correct for potential oscillator skew errors occurring in the oscillator crystal at the computing device.

20 Claims, 5 Drawing Sheets

SYSTEM AND METHOD FOR CALIBRATING A TIME OF DAY CLOCK IN A COMPUTING SYSTEM NODE PROVIDED IN A MULTI-NODE NETWORK

BACKGROUND OF THE INVENTION

1. Field of the Invention

The present invention relates generally to timing systems and processes in computer systems, and more particularly, to a system and method for calibrating and setting a Time-of-Day (TOD) clock timing source.

2. Description of the Prior Art

In today's parallel sysplex, TOD clocks are externally synchronized through a special External Time Reference (ETR) console. However, in an STP only configuration, ETR connections will not be available. Also, ETR connections do not provide any detection mechanism for oscillator failures.

GPS receivers can also be used to synchronize system clocks. However, the IBM z-Series® e-Servers do not currently support GPS connections. Even if these server architectures supported GPS connections, there would still be needed a system to ensure the accuracy of the external time readings. GPS receivers do not provide the microsecond level of guaranteed accuracy that is available with the ETR connection. Additionally, the GPS mechanism provides no means for detecting oscillator failures.

It would be highly desirable to provide a system method for enabling a TOD clock to be synchronized to an external standard time source, such as Coordinated Universal Time (UTC), to an accuracy on the order of a microsecond, even in the presence of significant latency and jitter in the path that reads the current time value. For exemplary purposes, errors in the path referred to herein are on the order of +/−100 milliseconds. Second, it would further be highly desirable to provide a system and method that enables the TOD steering rate to be finely adjusted to overcome inherent errors in the crystal oscillator frequency. It would further be highly desirable to provide a system and method that enables the system to self-diagnose oscillator failures where the error in the oscillator frequency exceeds documented specifications for tolerable oscillator error. This condition results from the normal aging of oscillator crystals and is not currently detectable in a running server by any known mechanism.

SUMMARY OF THE INVENTION

The present invention is directed to an apparatus and method implementing principles concerning well-known behavior of oscillator crystals. Namely, while any given oscillator crystal will have an inherent frequency error, e.g., in the range of −2 ppm to +2 ppm, the error is nearly constant over time provided the oscillator is kept at a constant temperature. Thus, according to the invention, this error in frequency can be determined and adjustments can be made to compensate for the error in order to keep the time-of-day clock at the server closely synchronized to an external time source. This is done in the current circumstance as follows:

Particularly, external time readings are made by a Hardware Management Console (HMC) periodically, e.g., at once per week intervals, via a scheduled dial-out service. These time stamps are presented to the system microcode which stores the values in an internal array along with several machine values that it obtains separately, such as the physical TOD value and TOD offset. More particularly, the HMC receives two timestamps—one from the external time source (e.g., UTC) and one from the primary-time server (also known as the active stratum-1 server) and computes the PRT offset by subtracting the time at the primary-time server from the time at the external time source. The HMC then delivers the PRT offset to the STP facility at the primary-time server by means of a "Set Primary Reference Time" console command for storage in an STP data structure. Thus, according to the present invention, the PRT offset is computed using those timestamps.

According to the invention, the PRT offset obtained from the console is the value that gets steered out, regardless of what the accumulated PRT-offset values might indicate about the skew at the local oscillator. After three weeks, when enough data samples have been accumulated, the oscillator skew is computed and the negative of that value constitutes the "fine steering rate" required to offset the inherent error in the local-oscillator frequency. Independently of this "fine steering rate", a "gross steering rate" is computed to reduce the PRT offset to zero. The gross steering rate is ramped at a rate of 1 ppm per Freewheel interval (FWI), until the maximum steering rate of 40 ppm is attained and then is maintained for as long as it takes to eliminate the PRT offset received from the console. Then the rate is ramped down again and is idle until the next "Set PRT" command arrives from the console. In some instances, the PRT offset values will be so small that a full ramp-up will not be necessary; the process of ramping up part way and then ramping back down will be sufficient to eliminate the entire offset. Once the oscillator skew has been computed correctly, the negative of this value is written to the "fine steering" register. The "fine steering" register is written before the PRT-offset-correction-steering operation is initiated.

Thus, the PRT-offset history that is accumulated in internal data structures (an architected and an unarchitected array) is not used to adjust the value of the PRT offset received from the console; however, the values in the arrays are used to compute a "fine steering" rate that is used to compensate for local-oscillator skew—and that compensation will have the indirect effect of reducing the PRT offsets received from the console.

According to the invention, accumulations of oscillator error over a long time period allow for detection of very small oscillator errors to be observable, even in the presence of noisy readings. In addition, the slope of the linear fit provides a very accurate measure of the current oscillator error. If the calculated error is observed to be within the specifications (+/−2 ppm), then the fine steering rate is set to the negative of the calculated slope. If the calculated error is outside of the specifications, then the fine-steering rate is limited to an absolute value of 2 ppm and a reporting procedure is invoked to notify an operator that a repair action is necessary.

The algorithm is repeated each week with an expanding range of array values until week fifteen (15), for example, when the window size is fixed at 16 array values. This provides for continual monitoring and self correcting of the oscillator to improved levels of accuracy, e.g., on the order of milliseconds with respect to the primary reference time.

Thus, according to one aspect of the invention, there is provided a system, method and computer program product for calibrating a Time Of Day (TOD)-clock in a computing system node provided in a multi-node network. The network comprises an infrastructure of computing devices each having a physical clock providing a time base for executing operations that is stepped to a common oscillator. The system implements steps for obtaining samples of timing values of a computing device in the network, the values including a physical clock value maintained at that device and a TOD-offset value; computing an oscillator skew value from the samples; setting a fine steering rate value as equal to the opposite of the computed oscillator skew value; and, utilizing the fine steering rate value to adjust the physical clock value and correct for potential oscillator skew errors occurring in the oscillator crystal at the computing device.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

The details of the mechanism for accurately setting the primary reference time to UTC time and subtracting out oscillator errors is now described here for the exemplary case of the STP (Server Time Protocol) timing network introduced into a networked parallel sysplex, such as the IBM zSeries® Parallel Sysplex. The self-diagnosing and reporting of oscillator failures is also described.

Figure 1:
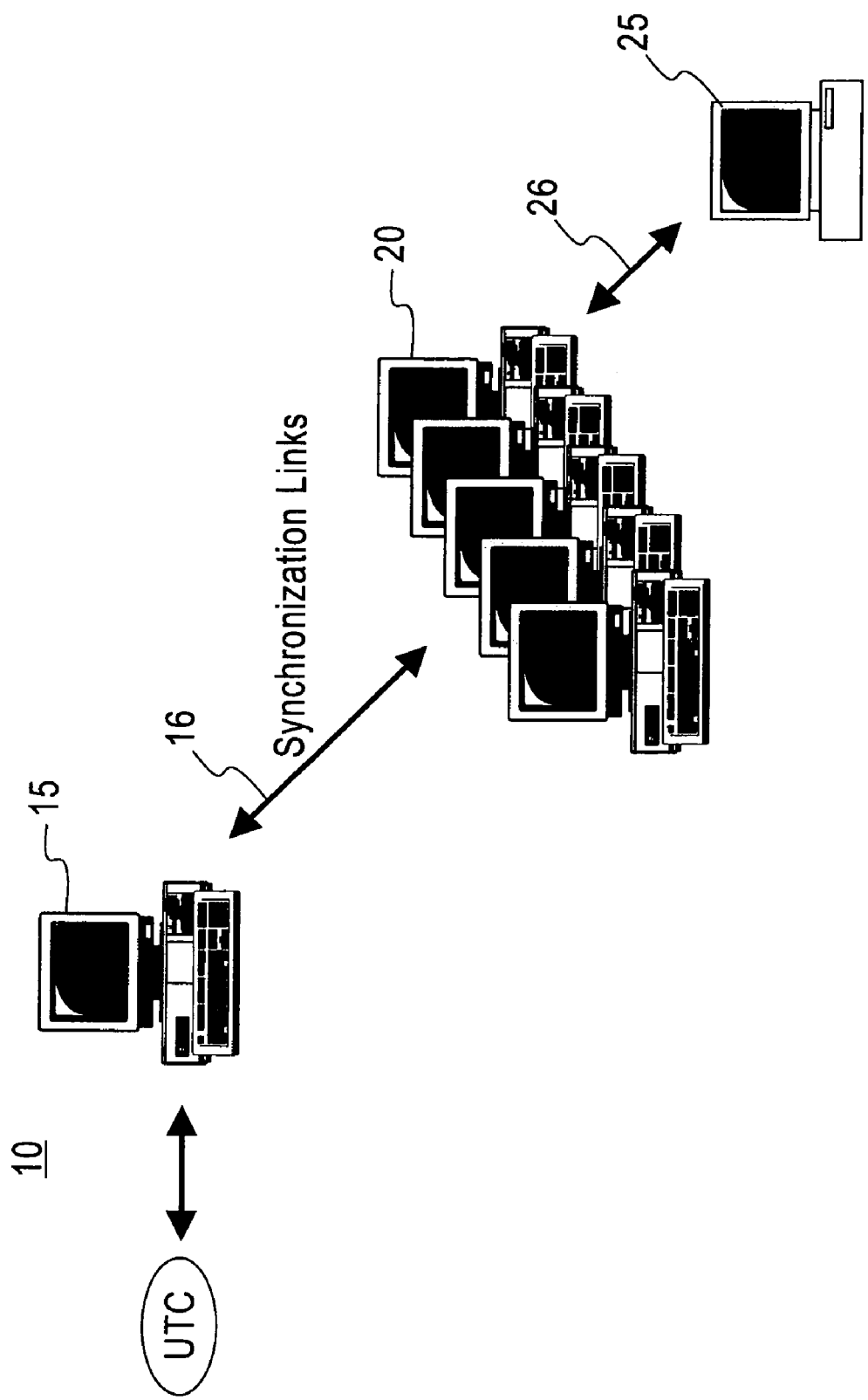
FIG. 1 is a diagram depicting the system 10 in which the present invention is implemented.

FIG. 1 particularly illustrates the STP (Server Time Protocol) timing network in which the present invention is implemented. In one embodiment, the system 10 includes a server device 15 and client devices 20, each device 15, 20 alternately referred to herein as a Central Electronics Complex or CEC which generally means a processor complex, packaged as a single entity. For instance, one CEC 15, 20 may comprise a stand-alone IBM System z9 or, an IBM eServer® zSeries® (e.g., a zSeries 990 (z990, z900) or zSeries 890 (z890)) systems, etc.). In FIG. 1, the first CEC or server node 15 (alternately referred to herein as the "active primary-time server" or "active Stratum-1" server) is shown receiving UTC information in a manner as conventionally known to skilled artisans, e.g., through timestamps provided by a UTC time referencing system (satellite, server, etc.). The active primary-time server 15 is connected to one or more CEC's or client nodes (alternately referred to as Stratum-2 servers), that, in turn may be connected to one or more additional client CEC or nodes 25 (i.e., Stratum-3 servers). Although not indicated in FIG. 1, a Hardware Management Console (HMC) device comprising a computer system is provided that periodically talks to the active Stratum-1 in the sysplex, e.g., at once per week intervals, via a scheduled dial-out service and obtains the timestamps. The HMC particularly receives two timestamps—one from the external time source (e.g., UTC) and one from the primary-time server (also known as the active (stratum-1) server, and a PRT offset is computed by subtracting the time at the primary-time server from the time at the external time source. The HMC then delivers the PRT offset to the STP facility at the primary-time server by means of a "Set Primary Reference Time" console command for storage in an array.

One exemplary application for implementing the present invention is a timing sysplex where clock devices are maintained in perfect synchronization in the system 10. In the description of the invention, such a timing sysplex is governed according to the Server Time Protocol. According to the STP protocol, data packets are sent between nodes in the sysplex to keep each node's clock in sync. Particularly, according to the STP architecture, a first CEC or system node 15 is the primary time source that bases its clock on the received UTC timestamps, and provides the time source for the remaining systems in the sysplex. This system, embodied as the active primary-time (Stratum-1) server 15, obtains a PRT-offset in the manner as described herein. Other mechanisms are used to synchronize the other systems to the first server device 15. Embodied as second (Stratum-2) or third (Stratum-3) server devices, these other server devices have either a direct connection to the first server (Stratum-2 server) or require one intermediate hop (Stratum-3 server). While these systems do not use the mechanism described here for setting their clocks, they do run the algorithms for two purposes: 1) they (Stratum-2 or Stratum-3servers) may be called upon to take over for the first server device if it fails. Running the algorithms allows the server performing the takeover to begin immediately with a fine-steering rate that compensates for the skew inherent in its oscillator—instead of having to accumulate data from scratch over a predetermined time interval (e.g., a three-week period); and, 2) the local oscillator errors can be tracked and errors detected and reported. Thus, while the algorithms are not immediately used by the other servers to synchronize their TOD clocks, the algorithm could be used for that purpose if desired. A further benefit is realized from the oscillator failure detection on all systems.

As shown in FIG. 1, in accordance with the STP protocol, the information provided in packets is communicated over coupling links 16, 26, where each CEC node sends data in a form referred to as a message command block (MCBs) and message response block (MRBs) to other system(s) in the STP network. In the timing sysplex depicted in FIG. 1, the MCBs and MRBs are exchanged periodically as packets between the CEC node 15 and each client CEC node 20 many times per second (e.g., once every 64 milliseconds) with each MRB comprising a packet including information relating to clock and timing synchronization at each node.

PRT Correction Algorithm

Figure 2A:
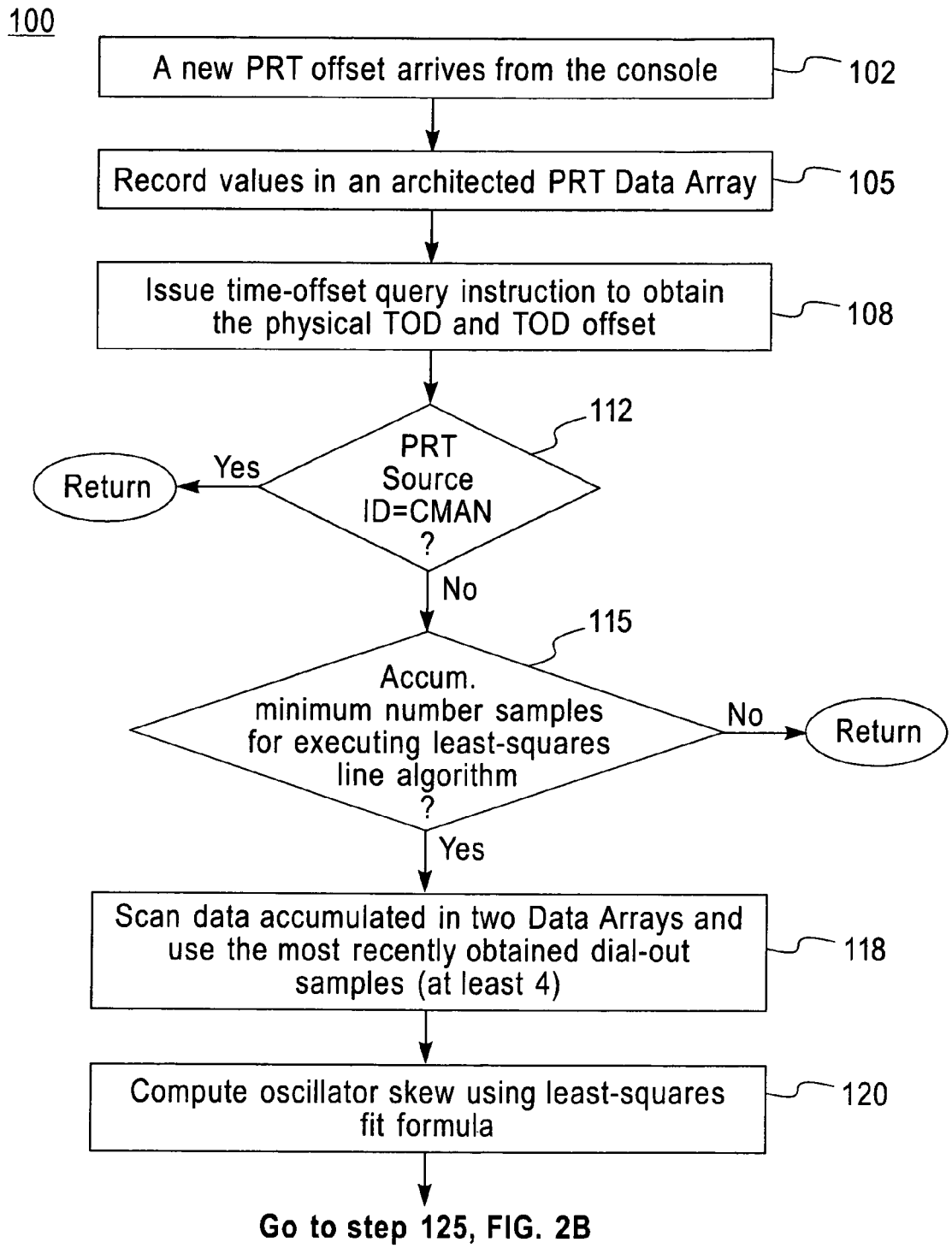
FIGS. 2A-2C illustrate a flow chart depicting the methodology 100 for implementing TOD calibration/correction according to the invention; and, FIG. 3 is a diagram illustrating the use of the CST offset term as it pertains to the secondary-time (Stratum-2, Stratum-3, etc.) servers
Figure 2B:
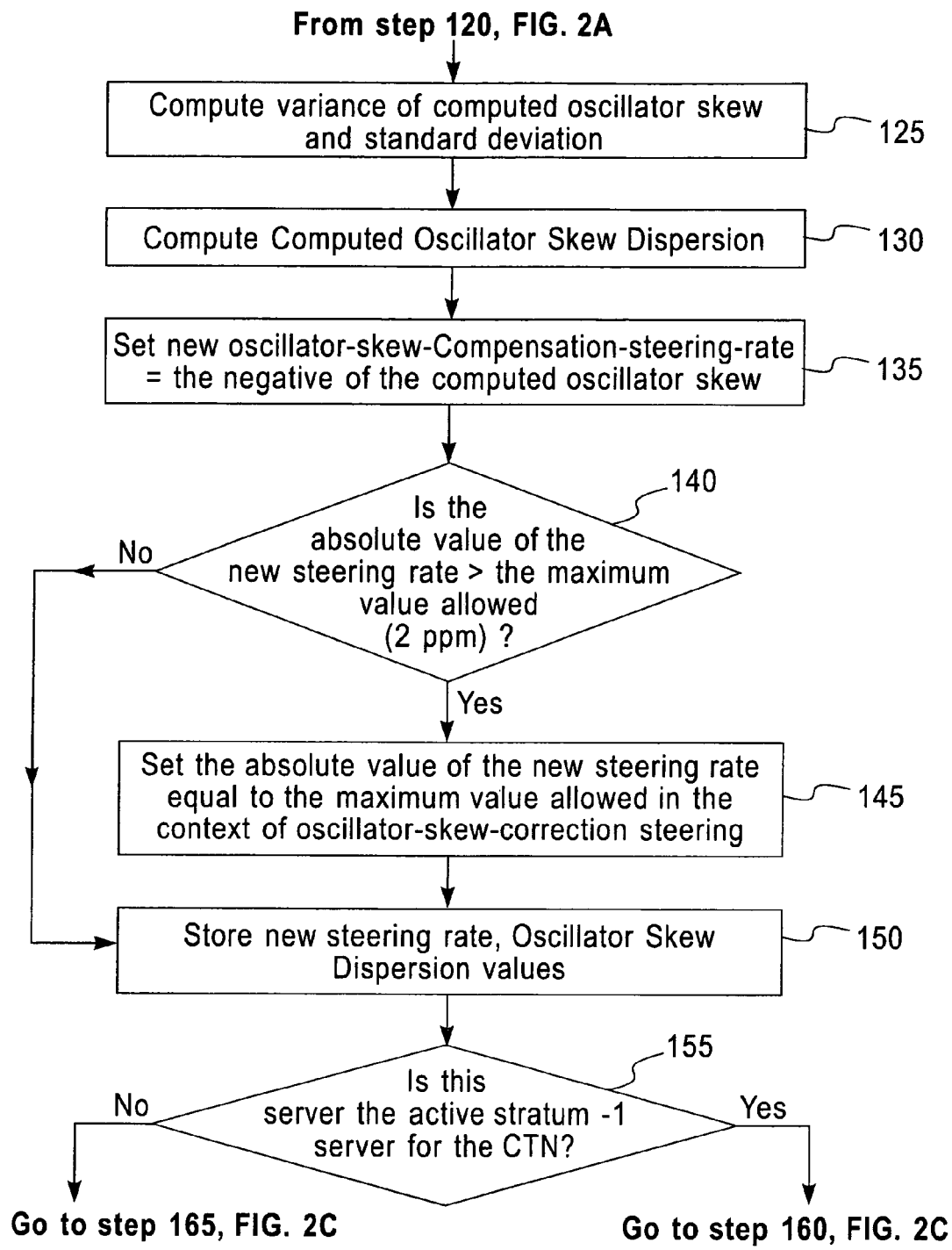
Figure 2C:
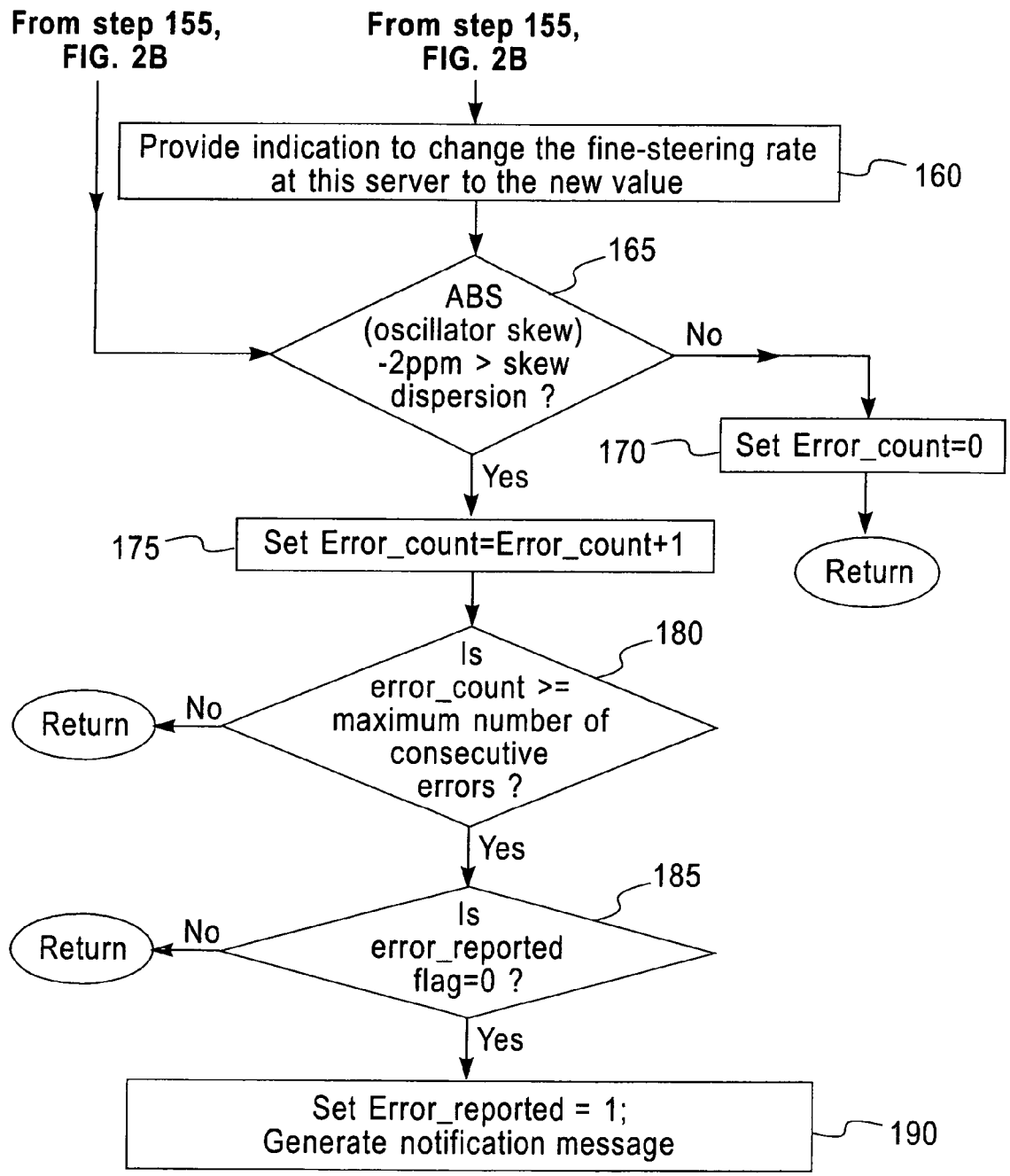

FIGS. 2A-2C illustrate a flow chart depicting the methodology 100 for implementing TOD calibration/correction at each node 15, 20, 25 according to the invention. As shown in FIG. 2A, there is implemented a first step 102 of receiving a new Set-PRT command arriving from the console. In response to receipt of the new PRT offset, as indicated at step 105, the following data are copied from the Command Request Block into a new entry in an architected PRT Data Array (not shown) including: 1) PRT Source ID (identifier); 2) Console Dispersion; 3) UTC Dispersion; 4) PRT-Offset; and 5) PRT Timestamp (informational only). A corresponding entry is now created in an unarchitected array (not shown) and, at step 108, is initialized with values obtained by executing a PTFF_QTO ("query TOD offset") instruction (a Perform Timing Facility query Function). Particularly, this function returns values including, but not limited to: a physical-clock value (e.g., 64-bit) which is the value of the physical clock at the most recent TOD-offset-update event, and, a TOD-offset value (e.g., 64-bit) indicating the value of the TOD-offset. A description of the PTFF-QTO instruction can be found in commonly-owned, co-pending U.S. patent application Ser. No. 11/223,886 entitled "SYSTEM AND METHOD FOR TOD CLOCK STEERING". At step 108, the physical-TOD-clock value and a TOD-offset-aggregate value are recorded in an unarchitected array associated entry-for-entry with the architected PRT Data Array. The TOD-offsetaggregate value that is recorded in the unarchitected array is the sum of the TOD-offset value supplied by the PTFF_QTO instruction, the PRT Offset value from the set-PRT Command Request Block (supplied by the console), and a Coordinated Server Time (CST) offset that is maintained at the server (and that will be zero in the case of a primary-time server).

Proceeding to step 112, a determination is made as to whether the PRT Source ID found in the Set-PRT Command Request Block indicates that the PRT Offset was generated manually ("CMAN"). If the PRT Source ID found in the Set-PRT Command Request Block is "CMAN", then the process terminates as manually-generated PRT information is not used as input to the least-squares process. Thus, unless there is a dial-out sample, no new information is available to work with, and the process stops and returns control to the STP code that fields the Set-PRT command.

When the latest sample is obtained via dial-out, then, as indicated at step 115, a determination is made as to whether enough samples have been accumulated to attempt an oscillator skew computation. That is, have there been accumulated at least the minimum number of samples required for execution of the least-squares-line algorithm. Further, the determination must be made as to whether the samples span the minimum period of time specified for the initial execution of the algorithm. Assuming, in an exemplary embodiment, that three weeks is the minimum length of time it takes to accumulate a valid set of physical-TOD/TOD-offset-aggregate data points and that four such data points must be present before the "least-squares line" algorithm can be used for the first time. After the first time, the oscillator skew is computed every time a new "set PRT" command is issued at the CTN—provided that the "minimum time period per sample" (one week, in the exemplary case) has passed since the previous sample was recorded and provided also that the new PRT information was not generated manually. The new physical-TOD/TOD-offset-aggregate samples are continuously added to the collection of data points that are submitted to the "least-squares line" algorithm until the at-least-16-data-points-and-at-least-15-weeks mark is reached.

From then on, only as many of the most-recent samples as are needed are used to provide at least 16 data points accumulated over a period of at least 15 weeks. Each PRT Offset value that is obtained from the console is accompanied by a Console Dispersion value and a UTC Dispersion value. Like the PR-T-Offset value, the two dispersion values are found in the Set-PRT Command Request Block. A combined value is expected to be in the range of 100 ms to 200 ms. Any PRT Offset is likely to be much smaller than that, unless given sufficient time to make itself discernible. Even with a skew of 2 ppm, it would take an entire week to accumulate an offset of just 1.2 seconds. Thus, at step 115, if there has been accumulated at least the minimum number of dial-out samples required for execution of the least-squares-line algorithm (at least 4) and they were accumulated over at least a three-week period, for example, then the process proceeds to step 118; otherwise, the process terminates at this point and returns control to the STP code that fields the Set-PRT command.

It should be understood that data for the manual samples are also stored in the two (one architected, one unarchitected) arrays described above; but these data are not used in the oscillator-skew computation; only the dial-out samples are used. Thus, in FIG. 2A, at step 118, there is depicted the step of scanning the data accumulated in the two arrays and using the 16 most-recently-obtained dial-out samples (or as many as exist, in the event that fewer than 16 dial-out samples have been accumulated). As the set of dial-out samples is scanned, the sample with the largest combined Console and UTC Dispersion value is located and recorded (this is the value that will be used to compute the variance of the oscillator skew). Particularly, for each sample, the Console Dispersion and the UTC Dispersion values—whichever sample yields the largest sum, is the value that is used. The formula used for calculating oscillator skew does not take into consideration the dispersion of each sample individually; however, it turns out that this has little significance, because of the 7-day interval allowed between samples. The effect of using only the sample with the largest combined dispersion is that the computation of the standard deviation of the oscillator skew tends to be biased on the plus side; and this in turn has the effect of giving the oscillator the benefit of the doubt in the context of bad-oscillator detection.

Continuing, at step 120, the oscillator skew is computed using a least-squares-fit algorithm having formula according to equation 1) as follows:

$$\text{oscillator skew} = \frac{\left((\text{sample\_count}) * \sum_{i=1}^{n} X_i Y_i - \left(\sum_{i=1}^{n} X_i\right) * \left(\sum_{i=1}^{n} Y_i\right)\right)}{\left((\text{sample\_count}) * \sum_{i=1}^{n} X_i^2 - \left(\sum_{i=1}^{n} X_i\right)^2\right)}$$

and the values of X and Y are computed by scanning through the current set of samples and computing each X and Y value as follows:

$X_i$=physical TOD from "this" dial-out entry (i) minus physical TOD from the oldest dial-out entry in the set of samples (i.e., $X_i$=physical TOD from sample i—physical TOD from sample 1); and, Y=TOD-offset aggregate from "this" dial-out entry (i) minus TOD-offset aggregate from the oldest dial-out entry in the set of samples (i.e., $Y_i$="TOD-offset aggregate" from sample i—"TOD-offset aggregate" from sample 1). As mentioned, the "TOD-offset aggregate" is the combined value of the physical TOD offset, the CST offset, and the PRT offset, as recorded in the unarchitected array associated with the PRT Data Array. It is noted that additional steps are performed at this time for calculating the variance (step 125) and "Oscillator Skew Dispersion" (step 130) as shown in FIG. 2B. These steps will be described in greater detail herein.

It is understood that the PRT Timestamp in the PRT Data Array entry is merely informational; the physical TOD value is used instead. Further, instead of using the PRT Offset by itself, it has been added to the TOD Offset supplied by the PTFF_QTO instruction. Thus, according to the invention, even after a fine-steering-rate value has been computed that exactly compensates for the oscillator skew, the oscillator skew will still be detected and computed precisely as each new sample arrives. The TOD offset value returned by the PTFF_QTO instruction will continue to grow at the same rate even after the clock at the server has been perfectly calibrated to UTC. In order to avoid potential problems if manual samples are included, only dial-out samples are used in the skew computation of equation 1.

It should be understood that the oscillator skew is computed and expressed in "parts per million"—e.g., a value on the order of $2/10^6$, which is a very small fractional value. However, an integral value is needed that is input to a PTFF-_SFS ("Set Fine-Steering Rate") instruction (a Perform Timing Facility control Function) as a signed 32-bit integer value in an exemplary implementation. Consequently, the computed oscillator-skew value is multiplied by the scaling factor $2^{44}$. Thus, an example computed skew of 2 ppm ends up as 0218DEF6x (i.e., multiplying that value by $10^6$ and then dividing it by $2^{44}$ will result in a value very close to 2.). A description of the PTFF-SFS instruction can be found in above-mentioned, commonly-owned, co-pending U.S. patent application Ser. No. 11/223,886.

Continuing to step 135, FIG. 2B, there is depicted the step of setting the fine steering rate as equal to the negative of the computed oscillator skew. That is, the computed oscillator skew has to change its sign in order to function as a fine-steering rate that compensates for the computed oscillator skew. If the oscillator skew is positive, then the fine-steering rate has the same magnitude as the oscillator skew but is negative; similarly if the oscillator skew is negative, then the fine-steering rate must be positive. However, it is not permitted for the fine-steering rate to have an absolute value that is greater than 2 ppm. Thus, a determination is made at step 140 as to whether the absolute value of the oscillator skew is greater than 2 ppm. If the absolute value of the oscillator skew is not greater than 2 ppm, then the process proceeds to step 150. Otherwise, at step 140, if it is determined that the absolute value of the oscillator skew is in fact greater than 2 ppm, the absolute value of the new fine-steering rate is set equal to the maximum value allowed in the context of oscillator-skew-correction steering—e.g., the absolute value of the new fine-steering rate is limited to 2 ppm. Finally, as indicated at step 150, the new steering rate is stored at the system element (SE)—as an operand in the architected CTN Parameters Block. As it has been previously calculated at step 130, the "Computed Oscillator Skew Dispersion" is also stored in the architected CTN Parameters Block.

Continuing to step 155, a determination is then made as to whether the present server is the active primary-time (Stratum-1) server for the CTN. If the present server is not the active primary-time (Stratum-1) server, then the process proceeds to step 165, FIG. 2C. Otherwise, if the present server is the active primary-time (Stratum-1) server, then the process proceeds to step 160 where an indication is made to change the fine steering rate to the new computed value. The process for changing the fine steering rate to a new computed value is performed in a step-wise fashion over a period of time as described in greater detail in commonly-owned, co-pending U.S. patent application Ser. No. 11/223,886. Referring back to step 125, FIG. 2B, there is depicted the step of computing the variance of the oscillator skew according to equation 2) as follows:

$$\text{variance} = \frac{\text{sample\_count} * (\text{max}dispersionvaluefromsampleset)^2}{\left( (\text{sample\_count}) * \sum_{i=1}^{n} X_i^2 - \left(\sum_{i=1}^{n} X_i\right)^2 \right)}$$

wherein said "maxdispersionvaluefromsampleset" is a previously recorded value comprising a sum of the largest Console and UTC Dispersion values of the samples. At step 125, the reason for computing the variance is to obtain the standard deviation, i.e., the square root of the variance, so that the system may compute an architected value called the "Oscillator Skew Dispersion" as depicted at step 130, FIG. 2B. The Computed Oscillator Skew Dispersion, in an exemplary implementation, is governed according to equation 3) as follows:

Oscillator Skew Dispersion=3*standard deviation*$2^{44}$  a.

For a variance that is not greater than zero, the "skew dispersion" is set to zero. The "skew dispersion" is a response operand of the Set-PRT command. However, the facility uses the oscillator-skew-dispersion value for reasons of its own: specifically, it uses it to see if the oscillator skew has broken out of the 2 ppm envelope. Preferably, an oscillator is never supposed to be off by more than 2 ppm, except, for instance, after it has been in service for many years. Even if the condition ABS(oscillator skew)>2 ppm is met, an alarm is not immediately raised. Instead, the facility must take into consideration the computed "oscillator skew dispersion" value. Thus, continuing to step 165, FIG. 2C, there is depicted the step of determining whether the absolute value of the computed oscillator skew minus the computed "Oscillator Skew Dispersion" is greater than the maximum steering rate allowed (e.g., 2 ppm) for steering in the context of oscillator-skew-compensation, i.e., whether

|(oscillator skew)|−"oscillator skew dispersion">2 ppm.

If the absolute value of the oscillator skew minus the "Oscillator Skew Dispersion" is not greater than the maximum steering rate allowed (e.g., is not greater than about +/−2 ppm), then the process proceeds to step 170 where an error count is set equal to zero (0) and the process returns. Otherwise, if at step 165, it is determined that the absolute value of the oscillator skew minus the "Computed Oscillator Skew Dispersion" is greater than the maximum steering rate allowed (e.g., is greater than 2 ppm), then the process proceeds to step 175 where an error count is incremented by one (1). In an example implementation, the "error_count" variable starts out equal to 0; it is reset to zero at -initial microcode load (IML) time or when an oscillator switch occurs, or anytime the computed oscillator skew is found to be within the −2 PPM to 2 PPM envelope.

Thus, it is observed that the facility permits the oscillator skew to exceed the allowable maximum by three standard deviations. In one implementation, even in this instance the facility does not immediately signal that there is a problem. Instead, continuing to step 180, a determination is made as to whether the error_count is greater than or equal to the maximum number of consecutive errors (e.g., six (6) in an example implementation) that can be tolerated before generating a "bad oscillator" report. If the error_count is not greater than or equal to the maximum allowable number of consecutive errors, then the process returns. Otherwise, if the error_count is greater than or equal to the maximum allowable number of consecutive errors, then the process proceeds to step 185 where a determination is made as to whether the error_reported flag is equal to zero, indicating that a "bad oscillator" report has not yet been generated. If the error_reported flag is not equal to zero (0), then the process returns. Otherwise, if the error_reported flag is equal to zero (0), then at step 190, a notification message is generated (a type-1 IQYYLOG). Particularly, the error_reported flag is set equal to 1 (the "error_reported" variable is initialized to zero (0); and, is reset to zero at IML time or when an oscillator switch occurs). This type-1 IQYYLOG will provide an indication that the oscillator at this server is defective and needs to be replaced. Thus, in the example implementation, if the facility records six (6) instances of oscillator error in a row, for example, then it finally generates a type-1 IQYYLOG calling for the replacement of the oscillator.

For an account that issues the Set-PRT command just once a week, at least five weeks will elapse between the time the oscillator error is first detected and the time the IQYYLOG is generated. Preferably, a conservative approach to replacing a system oscillator is implemented. For example, even if the oscillator drifts out of the 2 ppm envelope in a serious way, PRT-offset-correction steering will keep the TOD clock at the primary-time server under control. A skew of 2 ppm amounts to just 1.2 seconds a week, and it takes the PRT-offset-correction-steering state machine just a little over eight hours to steer out an offset of 1.2 seconds. A type-1 IQYYLOG is the kind of IQYYLOG that unambiguously calls for a repair action. It is not just the active primary-time (Stratum-1) server that will generate an IQYYLOG when a bad oscillator has been identified; this will happen at all of the secondary-time servers as well. That is, each server, no matter what its role in the CTN, will be monitoring its oscillator to make sure it hasn't drifted out of the 2 ppm envelope. Only the active primary-time (Stratum-1) server in an STP-only CTN gets the Set-PRT command; but the Primary Reference Time Correction Steering Information Block (PCSIB), i.e., a control block that is defined in the STP architecture, where the data from the Set-PRT command are stored, is broadcast throughout the CTN—which makes the oscillator-skew computation possible at secondary-time servers as well.

If the server that has just computed the steering rate is the active primary-time (stratum-1) server, then it will utilize the new steering rate. However, the server does not just place the new value in its fine-steering register. The process wants to see steering changes of no more than 1 ppm per freewheel interval (FWI), i.e., a time duration that corresponds to the maximum length of time a secondary-time server can stay synchronized to CST without getting an XTP MRB from its clock source. In example implementations, this interval is about 8.333 seconds on a z9 machine and 12.5 seconds on a z990 machine. If the active stratum-1 server were a z9 and there was suddenly an oscillator switch, it would be possible to see a sudden lurch in the oscillator skew from 2 ppm to −2 ppm. That is, the old oscillator was skewed to the maximum positive value and the new oscillator is skewed to the maximum negative value. The facility would not want to change the value in the fine-steering register from −2 ppm to 2 ppm all of a sudden. The work of nudging the fine-steering rate from −2 ppm to 2 ppm at the rate of 1 ppm per FWI will be handled by the same state machine that does the work of steering out the PRT offset. Getting the right value in the fine-steering register is, in fact, the very first thing the PRT-offset-correction-steering state machine does; it is only after that task has been completed that the state machine turns its attention to the usually much more complicated and much more time-consuming job of eliminating the PRT offset itself.

It should be understood that the Command Response Block for the Set-PRT command is returned before the PRT-offset-correction-steering state machine is set in motion. Execution of the Set-PRT command involves the computations shown above and the setting of some state variables that will cause the state-machine code to be invoked at every "message interval" (that is, every 64 milliseconds) until the PRT-offset-correction-steering operation is complete—a process that can take hours or even days.

Figure 3:
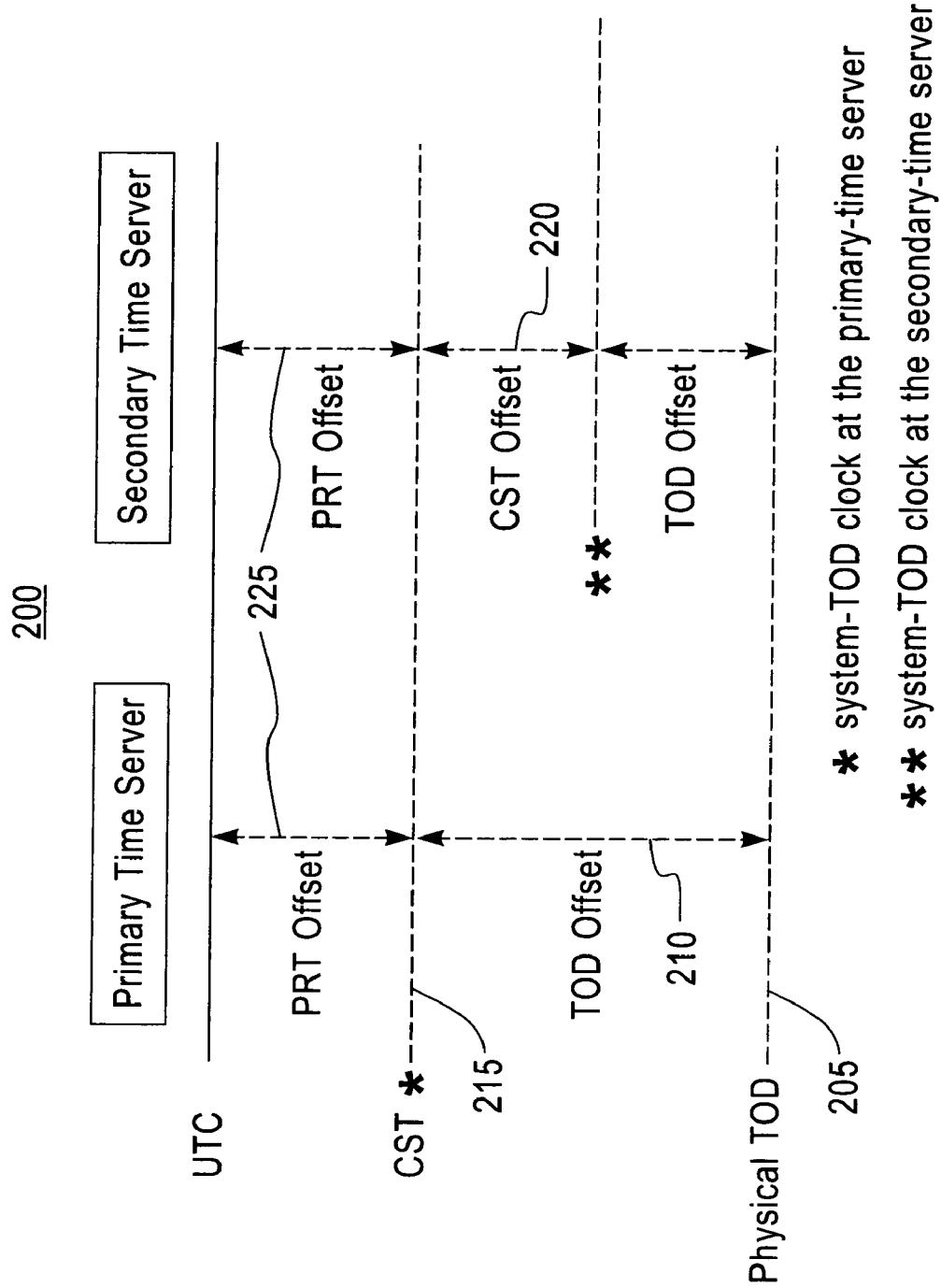

With respect to secondary-time servers, as mentioned above, the CST offset term has been included in the computation of the TOD offset. FIG. 3 is a diagram 200 illustrating the use of the CST offset term as it pertains to the secondary-time (Stratum-2) servers:

The physical clock 205 is the hardware clock at a server that is stepped by a hardware oscillator or, when a 9037 Sysplex Timer port is enabled, that is stepped by synchronization signals from the 9037 Sysplex Timer. In one example, the physical-TOD clock is a 104-bit register in a TOD-clock format.

The system-TOD clock at a server is formed by adding the TOD-clock offset 210 to certain bits (e.g., bits 0-63) of the physical-TOD clock; the remaining bits are as provided by the physical TOD clock. A carry out of bit position 0 is ignored for this calculation.

As mentioned, the TOD-clock offset is a 64-bit signed binary value that is added to the physical-TOD clock to form the system-TOD clock for the server. The TOD-clock offset represents the correction to the physical-TOD clock to attempt to keep the system-TOD clock synchronized with CST 215. The TOD-clock offset is steered to synchronize the system-TOD to CST. Under normal operation, the TOD offset is modified on a gradual basis such that the system-TOD clock is steered to CST transparently to LPAR and guests. At certain times, the TOD offset may also be stepped to a value for synchronization purposes or to set the clock to a specific value. When the server is in (External Time Reference) ETR-timing mode, the TOD-clock offset is equal to zero and the value is not modified by the STP facility (the steering rate is set to zero). When the server is in local-timing mode, the TOD-clock offset may be any value but is not modified by the STP facility.

The CST offset 220 is a 64-bit signed binary value that is equal to the clock offset relative to the TOD clock at the attached server selected as the clock source. The CST offset is added to the system-TOD clock to form the Coordinated Server Time (CST) 215. For the add operation, a carry out of bit 0 is ignored. For primary-time (Stratum-1) servers and servers at stratum level 0, the field is set to zero. Bit 63 of the CST offset has a resolution equal to that of bit 63 of the TOD clock. The initialized state of the CST offset is zero.

The PRT offset 225 is a 64-bit signed binary value in which bit 63 has a resolution equal to bit 63 of the TOD clock. The sum of the TOD clock at a primary (Stratum-1) server and the PRT offset provides the PRT for the Coordinated Timing Network (CTN). A carry out of bit 0 is ignored for the add operation.

According to the invention, a secondary-time (Stratum-2) server may function as an inactive primary-time (Stratum-1) server. Thus, if a takeover should occur in which the inactive primary-time (Stratum-1) server suddenly becomes the active primary-time (Stratum-1) server, the new active primary-time (Stratum-1) server would already have its fine-steering rate ready to go. It would not have to wait three weeks to accumulate the PRT-offset data needed to perform the computation as it would if it were to start from scratch. The inactive primary-time (Stratum-1) server would not use the computed fine-steering rate until the instant it actually became the new active primary-time (Stratum-1) server. Furthermore, all of the secondary-time (Stratum-2, Stratum 3, and so forth) servers perform the oscillator-skew computation—not just the server specified as the inactive stratum-1 server.

In an embodiment where the secondary-time servers behave just like the primary-time server with respect to fine steering, the system enables each of the secondary-time servers to write its fine-steering register with the negative of the result of its oscillator-skew computation, instead of just storing it at the system element (SE) in case it should one day become the new active primary-time (Stratum-1) server.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

Having thus described our invention, what we claim as new, and desire to secure by Letters Patent is:

1. A method for calibrating a Time Of Day (TOD)-clock in a computing system node provided in a multi-node network, said network comprising an infrastructure of computing devices each having a physical clock providing a time base for executing operations that is stepped to a common oscillator, said method comprising:
   a) obtaining samples of timing values of a computing device in said network, said values including a physical clock value maintained at that device and a TOD-offset-aggregate value;
   b) computing an oscillator skew value from said samples;
   c) setting a fine steering rate value as equal to the opposite of the computed oscillator skew value; and,
   d) utilizing said fine steering rate value to adjust said physical clock value and correct for potential oscillator skew errors occurring in the oscillator crystal at said computing device,
wherein said TOD-offset-aggregate value comprises: a TOD-offset value component that is added to a physical clock value to obtain a basic machine TOD clock at that node, a primary reference time (PRT) offset value component, and a Coordinated Server Time (CST) offset value component maintained at a computing device at that node.

2. The method as claimed in claim 1, wherein said multi-node network comprises a hierarchy of connected devices, a first device comprising a primary computing device providing a time base for synchronizing a plurality of secondary computing devices attached thereto via said coupling links.

3. The method as claimed in claim 2, wherein said multi-node network comprises a plurality of tertiary computing devices attached to one or more secondary computing devices via coupling links, said one or more secondary devices providing a time base for synchronizing said plurality of tertiary computing devices in said network.

4. The method as claimed in claim 2, wherein said node is a primary computing device, said CST offset maintained at said primary computing device is equal to zero.

5. The method as claimed in claim 1, wherein said oscillator skew computing comprises applying a least-squares-fit algorithm.

6. The method as claimed in claim 5, wherein said applied least-squares-fit algorithm computes said oscillator skew according to:

$$\frac{\left((\text{sample\_count}) * \sum_{i=1}^{n} X_i Y_i - \left(\sum_{i=1}^{n} X_i\right) * \left(\sum_{i=1}^{n} Y_i\right)\right)}{\left((\text{sample\_count}) * \sum_{i=1}^{n} X_i^2 - \left(\sum_{i=1}^{n} X_i\right)^2\right)}$$

where Xi and Yi values are computed by scanning through said samples where Xi=physical clock from the $i^{th}$ sample−physical clock from sample 1); and, Yi="TOD-offset aggregate" value from the $i^{th}$ sample−"TOD-offset aggregate" value from sample 1.

7. The method as claimed in claim 6, further comprising: computing a variance value of said computed oscillator skew, said variance equal to $$\frac{\text{sample\_count} * (\max{dispersionvaluefromsampleset})^2}{\left((\text{sample\_count}) * \sum_{i=1}^{n} X_i^2 - \left(\sum_{i=1}^{n} X_i\right)^2\right)}$$

where said "maxdispersionvaluefromsampleset" is a value comprising a combination of the largest dispersion values of the samples in a data array.

8. The method as claimed in claim 7, further comprising: computing a variance value of computing an oscillator skew dispersion value from said computed variance, said oscillator skew dispersion value calculated according to:

Oscillator Skew Dispersion=3*standard deviation*scale factor where said standard deviation is the square root of said variance; and said scale factor is a scaling factor.

9. The method as claimed in claim 8, further comprising:
   determining whether said oscillator skew value is within a predetermined range; and,
   providing an error indication if said oscillator skew value falls outside this range.

10. The method as claimed in claim 8, wherein said determining of said oscillator skew value is within a predetermined range further comprising calculating:

|(oscillator skew)|−oscillator skew dispersion>2 ppm.

11. An apparatus for calibrating a Time Of Day (TOD)-clock in a computing system node provided in a multi-node network, said network comprising an infrastructure of computing devices each having a physical clock providing a time base for executing operations that is stepped to a common oscillator, said apparatus comprising:
   means for obtaining samples of timing values of a computing device in said network, said values including a physical clock value maintained at that device and a TOD-offset-aggregate value;
   means for computing an oscillator skew value from said samples; and,
   a means for setting a fine steering rate value as equal to the opposite of the computed oscillator skew value, said means utilizing said fine steering rate value to adjust said physical clock value and correct for potential oscillator skew errors occurring in the oscillator crystal at said computing device, wherein said TOD-offset-aggregate value comprises: a TOD-offset value component that is added to a physical clock value to obtain a basic machine TOD clock at that node, a primary reference time (PRT) offset value component, and a Coordinated Server Time (CST) offset value component maintained at a computing device at that node.

12. The apparatus as claimed in claim 11, wherein said multi-node network comprises a hierarchy of connected devices, a first device comprising a primary computing device providing a time base for synchronizing a plurality of secondary computing devices attached thereto via said coupling links.

13. The apparatus as claimed in claim 12, wherein said multi-node network comprises a plurality of tertiary computing devices attached to one or more secondary computing devices via coupling links, said one or more secondary devices providing a time base for synchronizing said plurality of tertiary computing devices in said network.

14. The apparatus as claimed in claim 12, wherein said node is a primary computing device, said CST offset maintained at said primary computing device is equal to zero.

15. The apparatus as claimed in claim 11, wherein said means for computing an oscillator skew value applies a least-squares-fit algorithm.

16. The apparatus as claimed in claim 15, wherein said applied least-squares-fit algorithm computes said oscillator skew according to:

$$\frac{\left((\text{sample\_count}) * \sum_{i=1}^{n} X_i Y_i - \left(\sum_{i=1}^{n} X_i\right) * \left(\sum_{i=1}^{n} Y_i\right)\right)}{\left((\text{sample\_count}) * \sum_{i=1}^{n} X_i^2 - \left(\sum_{i=1}^{n} X_i\right)^2\right)}$$

where Xi and Yi values are computed by scanning through said samples where Xi=physical clock from the i$^{th}$ sample–physical clock from sample 1); and, Yi="TOD-offset aggregate" value from the i$^{th}$ sample–"TOD-offset aggregate" value from sample 1.

17. The apparatus as claimed in claim 16, further comprising: means for computing a variance value of said computed oscillator skew, said variance equal to $$\frac{\text{sample\_count} * (\text{max}dispersionvaluefromsampleset)^2}{\left((\text{sample\_count}) * \sum_{i=1}^{n} X_i^2 - \left(\sum_{i=1}^{n} X_i\right)^2\right)}$$

where said "maxdispersionvaluefromsampleset" is a value comprising a combination of the largest dispersion values of the samples in a data array.

18. The apparatus as claimed in claim 17, further comprising: means for computing a variance value of computing an oscillator skew dispersion value from said computed variance, said oscillator skew dispersion value calculated according to:

Oscillator Skew Dispersion=3*standard deviation*scale factor where said standard deviation is the square root of said variance; and said scale factor is a scaling factor.

19. The apparatus as claimed in claim 18, further comprising:
means for determining whether said oscillator skew value is within a predetermined range, said means providing an error indication if said oscillator skew value falls outside this range.

20. The apparatus as claimed in claim 19, wherein said means for determining whether said oscillator skew value is within a predetermined range further comprising means for calculating:

|(oscillator skew)|–oscillator skew dispersion>2 ppm.

* * * * *